United States Patent [19]

Hadley et al.

[11] 3,763,490
[45] Oct. 2, 1973

[54] ADAPTIVE BEAMFORMER WITH TIME CONSTANT CONTROL

[75] Inventors: Hugh W. Hadley, Skaneateles; David W. Saum, Syracuse, both of N.Y.

[73] Assignee: General Electric Company, Syracuse, N.Y.

[22] Filed: Dec. 10, 1971

[21] Appl. No.: 206,618

[52] U.S. Cl. ..................... 343/100 SA, 343/100 LE
[51] Int. Cl. ............................................. H04b 7/00
[58] Field of Search ................ 343/100 SA, 100 LE

[56] References Cited
UNITED STATES PATENTS
3,177,489  4/1965  Saltzberg .................... 343/100 LE

OTHER PUBLICATIONS

Widrow et al., Proc. of IEEE, Vol. 55, No. 12, 12-1967, pp. 2143-2159.

Primary Examiner—Benjamin A. Borchelt
Assistant Examiner—S. C. Buczinski
Attorney—Carl W. Baker et al.

[57] ABSTRACT

An adaptive beamformer and signal processor for sonar and other signal receptor arrays, in which beamforming is accomplished by correlation feedback loops providing matched weighting across the array. For improved performance of the adaptive beamformer thus comprised in the presence of large input transients, while preserving its steady state performance essentially unchanged, the time constant of the correlation feedback loops is placed under automatic control and adjusted thereby to prevent saturation of the loops even with large interference transients.

5 Claims, 3 Drawing Figures

(PRIOR ART)

Patented Oct. 2, 1973   3,763,490
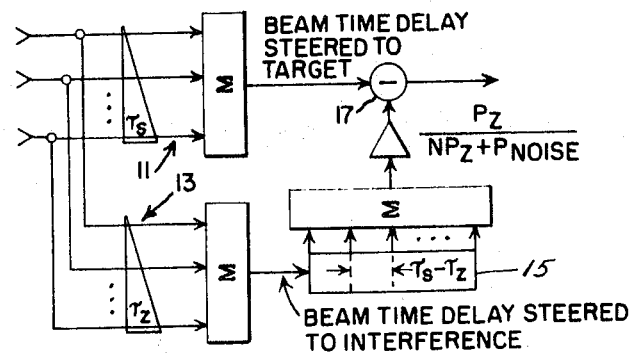
FIG.1
(PRIOR ART)
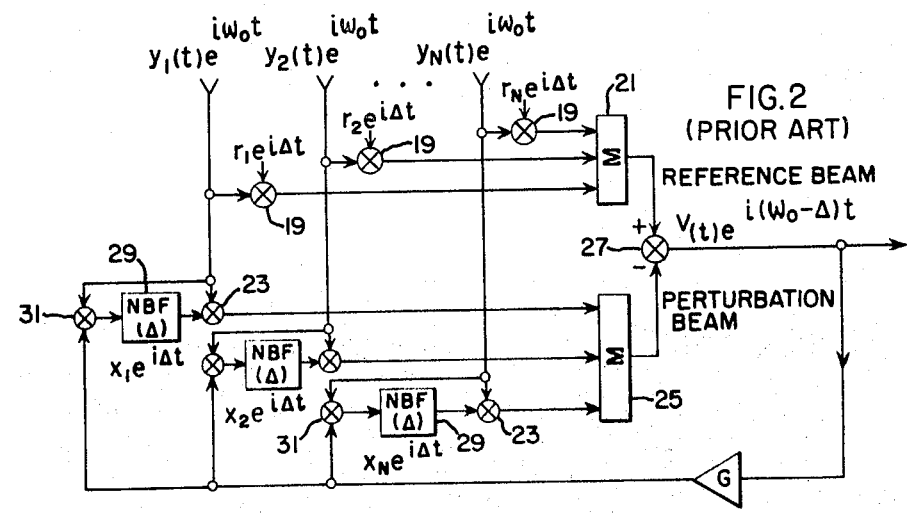
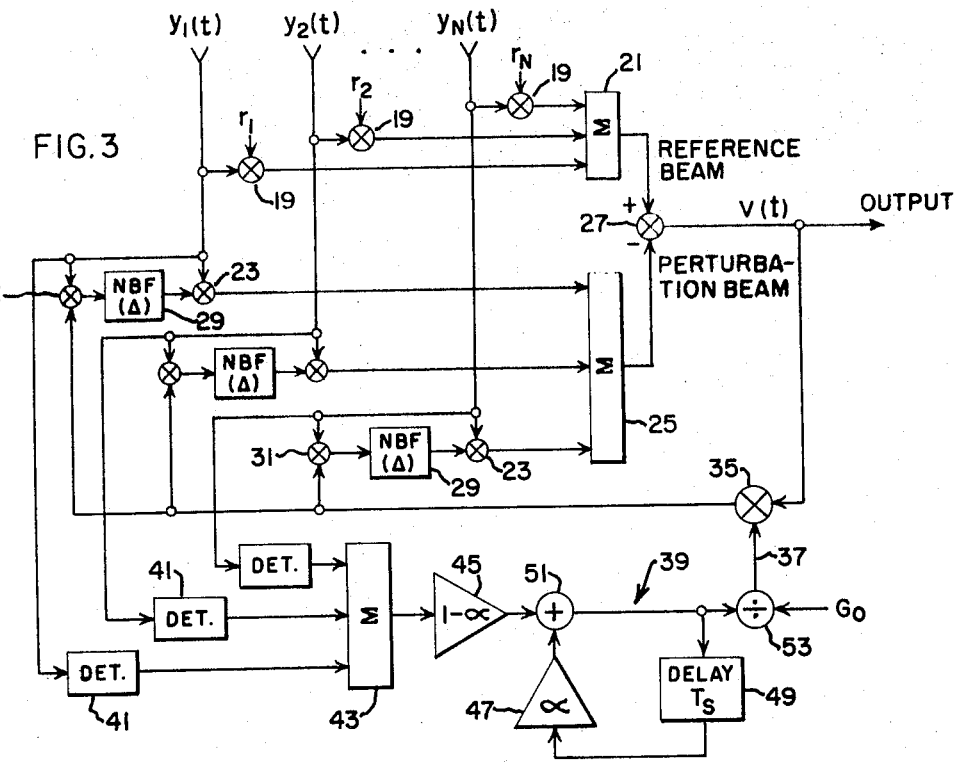

ADAPTIVE BEAMFORMER WITH TIME CONSTANT CONTROL

BACKGROUND OF THE INVENTION

The invention herein described was made in the course of or under a contract with the Department of the Navy.

This invention relates generally to signal detection in systems utilizing arrayed receptors for acoustic and electromagnetic wave signals as in sonar, radar, communications and seismic wave detection systems. More particularly, the invention relates to the processing of signals as received by such receptor arrays to accomplish array beamforming and to extract useful signal output from signals when received in company with large interference transients.

Many reports have appeared in recent literature on efforts to achieve optimal space-time processing of signals in array systems particularly for sonar application, so as to maximize system capabilities to detect useful signals immersed in noise. From these efforts there has evolved an optimal processor concept which is fairly well defined, and which also is narrowly defined in the sense that there is a strong similarity among most if not all of the so-called optimal processors. Generally such processors are composed of a beamformer or spatial processor followed by a filter, and for plane wave signals the beamformer is common to all and only the filter reflects the particular criterion of optimality selected. In all cases the spatial processor or beamformer functions to maximize the detectability of deterministic known signals immersed in gaussion interference, and it accomplishes this through a set of filter functions which achieve a maximized signal-to-interference power density ratio at each frequency. In this sense the beamformer may properly be considered a spatial prewhitener; at each frequency it suppresses peaks in the angular power density function of the noise or interference.

While optimal processors thus display a commonality of concept and basic function, attempts at their implementation have employed a variety of different approaches and experienced varying degrees of success in achieving optimal processing in practical systems. Many practical systems, for example, employ amplitude and phase steering, and arrays thus steered normally are not capable of generating an independent radiation pattern at each frequency as required for the theoretically optimal processor. Another problem arises where the characteristics of the useful signal and the noise do not enable temporal discrimination between them; in such cases it is difficult to accomplish the desired prewhitening without suppression of useful signals along with the noise.

Systems affording improved performance capabilities particularly in these problem areas are disclosed and claimed in the copending application of Dickey et al., Ser. No. 63,113 filed Aug. 12, 1970, which describes an adaptive beamformer with beam mainlobe maintenance. Automatic control of correlation feedback loops in accordance with the present invention may advantageously be applied to systems featuring mainlobe maintenance as described in the aforesaid Dickey application, but they are not limited in utility to such systems and have application as well to beamformers not incorporating that feature.

SUMMARY OF THE INVENTION

The present invention is directed to processors of the general kind just described and has as its primary objective the provision of such optimal processors which achieve desired performance even in the presence of large interference transients, and which do so in realizable implementations characterized by relative simplicity and economy of cost.

In its preferred embodiments as herein described the invention utilizes an adaption of a correlation feedback technique which was originally developed for radar sidelobe cancellation. In accordance with the invention, this technique is applied to provide beamforming and matched weighting of received signals in an amplitude and phase steered array, through feedback of the beam output signals to correlators at the array elements. These correlation feedback loops provide such matched weighting by nulling or cancelling coherent signals incident upon the array, except transient signals of low average energy over the correlator integration time. Thus the beamformer can receive active pulse-like signals with nearly full coherent addition, while suppressing steady interference.

In certain applications and environments in which interference transients are large, however, the signals required to be processed by the correlation feedback loops may at times become so large as to saturate them, causing loop instability and consequent impairment of beamformer performance continuing until feedback loop stability is restored. Such problem may be alleviated in accordance with the present invention by providing variability of the correlation feedback loop time constant, and providing automatic control of this variable by means responsive to received signal level so as to hold the loop time constant within the range through which correlation loop operation is stable. In the preferred embodiment described this time constant control comprises a sampled-data exponential filter which derives from the array elemental inputs a control signal approximating the average received power, and responsive to this signal the gain of the correlation feedback loops is adjusted during large input transients as necessary to avoid loop saturation, while preserving the steady-state performance of the beamformer essentially unchanged. In other words, the adaptive time constant of the system is controlled against dropping below a preselected value which may be specified independently of the steady state time constant. Use of an exponential filter to provide this control permits relatively simple implementation and affords a "smooth" control function which does not disturb the phase behavior of the adaptive process, as would a "hard limiting" type of control.

BRIEF DESCRIPTION OF THE DRAWINGS

FIG. 1 is a block diagram of an optimal array processor of known and generalized form;

FIG. 2 is a block diagram of a processor of the kind to which the present invention has primary application; and FIG. 3 is a block diagram of one implementation of adaptive beam-former in accordance with the invention.

DETAILED DESCRIPTION

With continued reference to the drawings, FIG. 1 illustrates an optimal array of elemental and generalized form illustrative of the operation of this general class of processor. The processor as shown may be seen to comprise a combination of two beamformers, including (1) a primary beamformer which functions to time-delay steer the primary beam to the target position, and (2) a perturbation beamformer which functions to time-delay steer an auxiliary beam to the interference source. The output of the perturbation beamformer is passed through a tapped delay line filter 15 which matches the frequency response of both beamformers to the incident interference. The beam outputs then are subtracted at 17 to suppress the interference.

The two beamformers in the array processor of FIG. 1 both have uniform amplitude, linear phase illuminations, and the array effectively generates a radiation pattern at each frequency which has a null at the angle of the interference. The ability of the optimal beamformer thus to generate an independent radiation pattern at each frequency offers a theoretical capability of extreme power and flexibility to array processors of this type.

The realization of this capability is not easily accomplished, however, in practical systems such as phase and amplitude weighted arrays which must operate across a broad band of frequencies. Such practical phased arrays are not capable of generating an independent radiation pattern at each frequency, but rather can generate only a single radiation pattern which must suffice to suppress broadband interference. As a consequence, if a phase and amplitude steered array is to succeed in cancelling such broadband interference, the radiation pattern generated by the array must include one or more angularly extended nulls, to accommodate the apparent spread of radiation even from a point source of broadband interference due to dispersion of receptor-to-receptor phase shifts over the frequency band of the interference.

It is possible to give phase and amplitude weighted arrays the capability to generate radiation patterns with angularly extended nulls, and some systems of this kind can perform so well even against broadband interference that for many applications of practical interest the performance degradation normally associated with amplitude and phase weighting the array signals is not appreciable. As more fully explained hereinafter, this capability may be achieved by making the signal weighting optimal in the sense that it maximizes the ratio of array output peak signal to average interference power. By analogy with temporal processing this optimal illumination function in amplitude and phase steered arrays is referred to as "matched weighting," and expressed in the language of matrix algebra it requires that the matrix of input signals be multiplied by the product of the inverse of the input interference covariance matrix and the matrix of array steering coefficients.

In the embodiments of the present invention particularly described hereinafter, such matched weighting is achieved in readily and economically realizable implementation by use of correlation feedback loops similar to those employed in radar sidelobe calcellers of the kind disclosed in U.S. Pat. No. 3,202,990 to Howells, and in the co-pending application Ser. No. 165,259, filed Jan. 9, 1962, in the names of Sidney P. Applebaum, Paul W. Howells and James C. Kovarik, both patent and application being assigned to the assignee of the present invention.

The cancellers disclosed in these prior cases have found wide application in protecting radars against strong noise-like jamming entering through the sidelobes of the antenna response. As fully explained in the patent and application, such cancellers employ a plurality of omnidirectional antennas which are disposed in close proximity to the main dish or array and have a gain roughly equal to the highest sidelobes of the primary antenna pattern, and which serve as sources of amplitude and phase shifted versions of the interference present in the main receiver. The canceller operates through a plurality of feedback correlation loops to derive amplitude and phase adjustments to each of the auxiliary channel signals, to combine the adjusted signals to form an auxiliary or perturbation beam, and to subtract the auxiliary beam signal from the main channel signal. The automatically derived amplitude and phase adjustments are such that the subtraction yields a cancellation of the main channel sidelobe jamming.

One salient characteristic of sidelobe cancellers of this type is that the closed-loop time constant of the feedback correlation loops is such that the loop lock-on time to low average power waveforms is long, whereas to high average power waveforms it is short. This, in fact, is one means by which the canceller is able to suppress interference but not useful signal. If the interference in the main channel is sufficiently strong to be troublesome even when introduced through the sidelobes, then in the auxiliary channel, with its omnidirectional sensor, it is quite likely to 10- to 30-db stronger than useful signal. In addition, in most radar applications the useful signal is pulse-like so that its power, averaged over the closed-loop time constant, is very low. The interference, on the other hand, is generally a high duty cycle noise-like wave with a corresponding high power when averaged over the closed-loop time constant.

The omnis or other auxiliary elements in a multiple sidelobe canceller may be regarded as elements of an auxiliary array. The amplitude and phase weights derived by the canceller constitute the illumination function for such array. By combining the adjusted auxiliary channel signals and then subtracting their sum from the main channel signal the canceller is, in effect, forming an auxiliary or perturbation beam and subtracting it from the primary beam. Multiple interference sources will be cancelled provided the perturbation pattern matches the primary pattern at the angles-of-arrival of the interference.

Matched weighting is an application of this multiple sidelobe canceller principle to the phased array. The primary difference associated with this application is that the omnidirectional elements of the phased array serve as sources of both the primary channel signal and the auxiliary channel signals and no additional sensors are required. FIG. 2 illustrates such matched weighting array using feedback correlation loops similar to those of side-lobe cancellers for both beamforming and interference cancellation. Reference to FIG. 2 indicates that the composite receptor signals $\{y_k(t)\}$ are weighted in mixers 19 by a nominal of reference illumination $\{r_k\}$ and summed at 21 to form the reference beam output:

$$v_{\text{nom}}(t) = \sum_{k=1}^{N} r_k^* y_k(t) \qquad (1)$$

and also weighted in mixers 23 by a perturbation illumination function $\{x_k(t)\}$ and summed at 25 to form the perturbation beam output:

$$v_{\text{pert}}(t) = \sum_{k=1}^{N} x_k^*(t) y_k(t) \qquad (2)$$

The net output or residue, obtained by subtraction at 27 of the perturbation output from the nominal, is then, from equations (1) and (2):

$$v(t) = \sum_{k=1}^{N} [r_k - x_k(t)]^* y_k(t) \qquad (3)$$

From equation (3) it is noted that the net weight applied to each receptor signal is the difference between the nominal and perturbation weights.

The perturbation weights, $\{x_k(t)\}$, are amplified outputs of the narrowband single-pole filters 29 satisfying the differential equations:

$$T\dot{x}_k(t) + x_k(t) = G y_k(t) v^*(t)$$

$$= G \sum_{m=1}^{N} \overline{y_k(t) y_m^*(t)} [r_m - x_m(t)]; \quad k = 1, N \qquad (4)$$

by virtue of equation (3). If it is assumed that the narrowband filter outputs are slowly varying relative to the channel waveforms an ensemble average of equation (3) yields:

$$T\dot{x}_k(t) + x_k(t) = G \sum_{m=1}^{N} \overline{y_k(t) y_m^*(t)} [r_m - x_m(t)];$$

$$k = 1, N \qquad (5)$$

If it is further assumed that the receptor-pair correlations of the composite receptor waveforms, $\overline{y_k^*(t) y_m(t)}$, may be approximated by the correlations of just the interference, then equation (5) is equivalent to:

$$T\dot{x}_k(t) - x_k(t) = G \sum_{m=1}^{N} M_{km}^*[r_m - x_m(t)];$$

$$k = 1, N \qquad (6)$$

where $M_{km}$ is the correlation between the interference at the $k^{th}$ and $m^{th}$ array elements. The validity of this approximation is quite critical, for unless the useful signal correlations may be neglected, the matched weighting generator will attempt to suppress useful signal as well as interference.

The net elemental weights, $\{c_k(t)\}$, are given by:

$$c_k(t) = r_k - x_k(t);$$
$$k = 1, N \qquad (7)$$

Hence, assuming a time invariant reference illumination:

$$\dot{c}_k(t) = -\dot{x}_k(t);$$
$$k = 1, N \qquad (8)$$

Substitution of equations (7) and (8) into equation (6) yields:

$$T\dot{c}_k(t) + c_k(t) + G \sum_{m=1}^{N} M_{km}^* c_m(t) = r_k;$$

$$k = 1, N \qquad (9)$$

Having derived a differential equation specifying each of the N weights, it is now helpful to combine them into the single matrix equation:

$$T\dot{\underline{c}} + [\underline{I} + G\underline{M}^*]\underline{c} = \underline{r} \qquad (10)$$

where
$c$ = the net illumination vector with elements $\{c_k(t)\}$
$\dot{c}$ = its derivative
$M$ = the interference correlation matrix with elements $\{M_{km}\}$
$r$ = the reference steering vector with elements $\{r_k\}$ The steady-state solution for the illumination function is readily seen to be:

$$\underline{c}_{ss} = \frac{1}{G} \left[ \frac{1}{G} \underline{I} + \underline{M}^* \right]^{-1} \underline{r} \qquad (11)$$

and, if the product of the amplifier gain and incident waveform power is much greater than unity, this reduces to:

$$\underline{c}_{ss} = \frac{1}{G} \underline{M}^{*-1} \underline{r} \qquad (12)$$

Hence, if the nominal weights are proportional to the useful elemental signals, the derived excitation (to within the error associated with a type zero servo system) is indeed the desired match weighting.

The transient behavior of the net aperture weights is determined from a solution of the homogenous differential equation:

$$\dot{\underline{c}}_t + \frac{1}{T}[\underline{I} + G\underline{M}^*]\underline{c}_t = 0 \qquad (13)$$

Unfortunately the solution entails a determination of the eigenvalues of $[\underline{I} + G\underline{M}^*]$ which, in general, is quite difficult. However, one significant property of the matched weighting generator is easily established. Because the correlation matrix is positive-definite, all of the eigenvalues of $[\underline{I} + G\underline{M}^*]$ are necessarily positive and, as a consequence, the system is unconditionally stable in the sense of unconditional convergence on the solution.

There are some special situations in which an explicit solution for the transient response is readily derived. It may be shown, for example, that when the interference is composed of noise (at power level $P_n$) independent from receptor to receptor, plus narrowband interference (at power level $P_z$) emanating from a far-field point source, the derived aperture weights approach their steady state value with the time constant:

$$T_{CL} = T_s/G(NP_z + P_n) + 1 \qquad (14)$$

where $T_s$ is the sampling interval and $G$ is the feedback loop gain. Hence, the matched weighting generator "locks on" rapidly when the product of the number of array receptors and interference power level, i.e., the product $NP_z$, is high.

The time constant relation of Equation (14) may be further simplified where, as is usually the case, the background signal input into the beamformer is attributable largely to a directional interference source. In such case the narrowband interference is the predominant input and the noise input is relatively very much smaller, so that $NP_z >> P_n$. The quantity $P_n$ may then be neglected, and neglecting also the "one" which likewise is small as compared to $NP_z$, Equation (14) reduces to:

$$T_{CL} \approx T_s/GNP_z \qquad (15)$$

and if time is measured in increments of sample spacing (15) becomes:

$$T_{CL} \approx 1/GNP_z \qquad (16)$$

In implementing prior canceller and adaptive beamformer systems using correlation feedback loops with N inputs operative in this way, it has been the usual practice in system design to assume a value for the average interference power $P_z$ and then adjust the loop gain G to yield a time constant $T_{CL}$ sufficiently long to prevent loop response to useful signal input. This enables temporal discrimination between useful signal and interference, for cancellation of the latter without also cancelling the former. Normally the loop time constant is made just sufficiently long to accomplish this purpose, since to make it any longer would slow the loop "lock on" time and reduce cancellation effectiveness correspondingly.

Under normal steady-state conditions this design approach has been found satisfactory. However, when large interference transients are received the increase in input power $P_z$ causes the closed-loop time constant $T_{CL}$ to be reduced proportionately, and if the value of this time constant drops to a point such that it is less than one sample interval, i.e., if $T_{CL} > T_s$ or $GNP_z > 1$, the loop becomes unstable. The perturbation beam weights tend to assume very large values and system performance may be seriously degraded by undesirable output fluctuations through the duration of the transient and the recovery period which follows it.

In accordance with the invention, correlation feedback loop stability is assured even in the presence of such large interference transients by addition of an automatic loop time constant control as illustrated in FIG. 3. Apart from this addition most of the elements in the system of FIG. 3 are common to that of FIG. 2, carry similar reference numerals, and need not again be described.

The added elements in FIG. 3 include a multiplier 35 which replaces the constant multiplier G in FIG. 2 and enables adjustment of the feedback signal gain in accordance with a control signal input on lead 37. This feedback control signal is generated through a single pole exponential filter designated generally by reference numeral 39, from an input representing the instantaneous received power level averaged over the N elements of the receptor array. Such average power level signal is derived by processing the received signals through detectors 41 and summing them at 43, and its gain is adjusted at 45 by a factor $1-\alpha$. This gain factor is complementary to the gain $\alpha$ of an operational amplifier 47 forming part of the filter 39, so as to yield unity gain for the combination.

Filter 39 functions as a sampled-data exponential filter, and to this end it comprises a recirculation loop in which a delay element 49 delays the recirculating signal through one sampling interval $T_s$ before recombination with the input in an adder element 51. The filtered output from 39 is a biased and weighted approximation of time-averaged receptor signal input power, and is applied to one input of a divider 53 which has as its other input a fixed reference signal $G_o$ and which outputs on lead 37 the desired signal for control of correlation loop feedback signal gain through mixer 35.

The sampled-data weighting function provided by filter 39, including the $1-\alpha$ gain factor introduced at 45, may be written as:

$$Y_i = (1-\alpha) X_i + \alpha Y_{i-1} \qquad (17)$$

where $X$ is the filter input from summer 43 and $Y$ is the output to divider 53. From this relation it will be seen that $Y$ is an approximation of time-averaged received signal power, and that under steady state conditions the accuracy of this approximation improves as $\alpha$ increases to a limit of unity.

Referring again to Equation 16, this relation may be modified to more specifically describe the operation of filter 39 by replacing the gain term G with the term $G_o/\hat{P}$, which gives:

$$T_{CL} \approx \hat{P}/G_o NP_z \qquad (18)$$

Here $G_o$ is a nominal gain constant determined by the value of the fixed reference signal introduced as one input to divider 53, and $\hat{P}$ is the other input thereto representing the approximation which is outputted by filter 39 of time-average received signal power.

The instantaneous behavior of $T_{CL}$ may be expressed in terms of the sampled-data weighting function of Equation (17) as follows:
$$T_{CL} = Y_i/G_o N X_i = (1-\alpha)X_i + \alpha Y_{i-1}/G_o N X_i = 1-\alpha/G_o N + \alpha Y_{i-1}/G_o N X_i \qquad (19)$$

Under steady-state conditions, $Y_{i-1} = X_i$, and the closed-loop time constant becomes:

$$T_{CL} = 1/G_o N \qquad (20)$$

Under worst-case (increasing transient) conditions, $Y_{i-1} << X_i$, and the time constant decreases to a value of:

$$T_{CL} = 1 - \alpha/G_o N \qquad (21)$$

Of interest is the relation between these two time constant values.

$$T_{CL} \text{ (Steady-State)}/T_{CL} \text{ (Minimum)} = 1/1 - \alpha, \quad (22)$$

which is equal to the time constant $T_F$, of the exponential filter, measured in sample periods.

The operating parameters of the filter may readily be calculated using Equation (22). If $T_{ss}$ is the optimized steady-state time constant and $T_{min}$ is the minimum allowable time constant for loop stability, then from Equation (22) the exponential filter parameter $\alpha$ is seen to be:

$$\alpha = 1 - T_{min}/T_{ss} \quad (23)$$

and the nominal gain $G_o$ is:

$$G_o = 1/N\, T_{ss} \quad (24)$$

The circuitry of FIG. 3 may be simplified in cases where the several loop inputs ($y_1, y_2 \ldots y_n$) are highly correlated in an envelope sense, i.e., the gross power variations are similar in all loop inputs. In such cases it is possible to use a single loop input $y_1$ as the signal input to the exponential filter 39, to thus permit omission of the summing device 43 and associated circuitry.

Implementation of the exponential filter 39 is feasible in either analog or digital form, though the digital version is the simpler because certain of the required signal processing functions, particularly the delay and division functions, are more easily accomplished with digital processing than with analog. The problems resulting from correlation loop saturation on large interference transients are somewhat different in analog and digitally implemented beamformer systems, but automatic time constant control in accordance with the present invention is palliative of the problems of both and thus advantageous in both. Similarly, the invention has application to adaptive beamformer systems which include mainlobe maintenace as described in the aforementioned copending application of Dickey et al., as well as to systems not incorporating that feature. As also described in the Dickey et al. case the reference and perturbation beamformers may alternatively be of the form in which each elemental signal is weighted by the difference between nominal and perturbation weights and then combined, in lieu of independently forming the reference and perturbation beams and subsequentially combining them as described above.

While in the foregoing description of the invention only certain presently preferred embodiments have been illustrated and described by way of example, many modifications will occur to those skilled in the art and it therefore should be understood that the appended claims are intended to cover all such modifications as fall within the true spirit and scope of the invention.

What is claimed as new and desired to be secured by Letters Patent of the United States is:

1. In combination with an array of wave receptors, an adaptive array beamformer comprising primary beamformer means for phase and amplitude weighting the elemental signals of said array with nominal weights so as to form and direct a beam mainlobe to the angle of desired maximum response of the array, auxiliary, beamformer means including a plurality of feedback correlation loops each having as inputs the beamformer output and one of said elemental signals and being operative to derive therefrom a perturbation weight and to output a signal which is phase and amplitude weighted thereby so as to form and direct a null to the angle of arrival of interference, means for adjusting the correlation feedback loop time constant, and means responsive to said elemental signals for controlling said time constant adjustment means so as to avoid loop saturation with large interference transients.

2. An array beamformer as defined in claim 1 wherein said means responsive to said elemental signals derives therefrom an average received power level signal, and includes sampled-data exponential filter means through which said power level signal is processed to introduce a weighting function such that said correlation loop time constant adjustment means responds to power level transients to adjust said time constant to maintain correlation loop stability and does not thus respond to steady state changes in power level.

3. An array beamformer as defined in claim 2 wherein said sampled-data exponential filter means includes a signal recirculation loop providing delay equal to the sampling interval and gain such as to yield the desired weighting function.

4. An array beamformer as defined in claim 3, further including means for varying the gain of said control signal to obtain the desired steady state value of correlation feedback loop time constant.

5. An array beamformer as defined in claim 1 wherein said means responsive to said elemental signals for controlling said time constant adjustment means comprises means for deriving from at least one of said elemental signals a control signal varying with the difference of instantaneous and time-averaged power levels thereof, and wherein said means for adjusting the correlation feedback loop time constant comprises loop gain control means operative to adjust loop gain in response to the control signal thus derived.

* * * * *